United States Patent [19]

Isobe

[11] Patent Number: 4,763,136

[45] Date of Patent: Aug. 9, 1988

[54] PLANAR THERMAL HEAD AND DISPLAY DEVICE INCORPORATING THE SAME

[75] Inventor: Minoru Isobe, Tokyo, Japan

[73] Assignee: OKI Electric Industry Co., Ltd., Tokyo, Japan

[21] Appl. No.: 35,511

[22] Filed: Apr. 7, 1987

[30] Foreign Application Priority Data

Apr. 8, 1986 [JP] Japan .................................. 61-79122
Apr. 8, 1986 [JP] Japan .................................. 61-79123

[51] Int. Cl.[4] ............................................. G01D 15/10

[52] U.S. Cl. .................................. 346/76 R; 219/216; 400/120; 346/76 PH

[58] Field of Search ............ 219/216 PH; 346/76 PH, 346/76 R, 1.1; 400/120 PH; 338/328; 350/351

[56] References Cited

U.S. PATENT DOCUMENTS 4,034,187 7/1977 Tomioka et al. ............. 219/216 PH
4,514,736 4/1985 Moriguchi et al. ............ 346/76 PH

FOREIGN PATENT DOCUMENTS 0049967 3/1985 Japan .................................. 400/120
60-33254 8/1985 Japan .
60-208787 10/1985 Japan .
0181660 8/1986 Japan .............................. 346/76 PH

OTHER PUBLICATIONS

"Display System Using Reversible Heat-Sensitive Material", Nakaya, S., Saito, K., Kotani, S., Abiko, I., Araki, T.; SID 80 Digest, pp. 226-227.
Ito, et al.; "Two-dimensional Thermal Device"; Microelectronics Symposium, Jul. 1985, Tokyo, Japan.

*Primary Examiner*—E. A. Goldberg
*Assistant Examiner*—Huan H. Tran
*Attorney, Agent, or Firm*—Spencer & Frank

[57] ABSTRACT

A planar thermal head and a thermal display incorporating it comprising a plurality of parallel first electrode lines formed on one side of an electrically resistive layer, and a plurality of parallel second electrode lines formed on the other side of the resistive layer the second electrode lines are oriented to intersect the first parallel electrode lines. A pair of electrodes respectively constituted of part of or connected to one of the first electrode lines and one of the second electrode lines are positioned on opposite sides of the resistive layer for causing a current flow through the resistive layer, and a part of the resistive layer through which a current is made to flow by the pair of electrodes forms a thermal dot.

20 Claims, 13 Drawing Sheets

PLANAR THERMAL HEAD AND DISPLAY DEVICE INCORPORATING THE SAME

BACKGROUND OF THE INVENTION

This invention relates to a planar (two-dimensional) thermal head in which the thermal dots are arranged in a matrix and a display device incorporating the planar thermal head.

FIG. 1 is a cross-sectional view showing a prior art planar thermal head. As illustrated, it comprises a base 1 made of a material such as a ceramic. Running parallel to the X axis (left to right in the drawing) on the base 1 are a plurality of equally-spaced X wiring lines 2, and over these a thermally insulating layer 3 consisting of polyimide or another material with thermal insulating properties is applied. A plurality of resistive elements 4 are formed over this thermally insulating layer 3 to act as the heat-generating bodies. One side of each resistive element 4 is connected to the X wiring via a through-hole conductor 5. The other side is connected to one of Y wiring lines 6 which are arranged on the thermally insulating layer 3 at equally-spacd intervals running parallel to the Y axis direction (normal to the page). The resistive elements 4 thus form a matrix of thermal dots in the X and Y directions.

A thermal display device employing a planar (two-dimensional) thermal head similar to that shown in FIG. 1 is described in Japanese Laid-Open Patent Application No. 208787/1985. FIG. 2 shows a cross-sectional view of this planar thermal display, which comprises a glass substrate 11, a plurality of X wiring lines 12, a thermally insulating layer 13 of a material such as polyimide, a plurality of through-hole conductors 15, a plurality of Y wiring lines 16, a heat-sensitive, temperature-indicating layer 17, and a plurality of transparent resistive elements 14. To display an image, a single transparent resistive element 14 is selected by selecting one of the X wiring lines 12 and one of the Y wiring lines 16. Specifically, a voltage of 0 is applied to the selected terminal of the X wiring lines 12 and a voltage of $\frac{2}{3}E$ to the nonselected terminals, and a voltage of E is applied to the selected terminal of the Y wiring lines 16 and a voltage of $\frac{1}{3}E$ to the nonselected terminals. Thus a voltage of E is applied across the selected transparent resistive element 14 while a voltage of $\frac{1}{3}E$ is applied across the nonselected transparent resistive elements 14. As a result of receiving three times the voltage of the other electrodes, the transparent resistive element 14 selected according to the image data generates nine times as much heat. This local heating induces a color change in the temperature-indicating layer 17.

In the prior art planar thermal heads having the structure shown in FIG. 1, the following problems occur:

(a) The structure and fabrication process are complex, due to the need to provide one through-hole conductor 5 passing through the thermally insulating layer 3 and one resistive element 4 for each thermal dot.

(b) As noted in the Japanese Laid-Open Patent Application cited above, not all of the heat generated by the resistive elements 4 is conducted to the temperature-indicating layer. A substantial amount of the heat diffuses to the thermally insulating layer 3. This planar thermal head therefore requires a very large driving power.

The planar thermal display with the structure shown in FIG. 2 suffers from the problem of complex structure and difficult fabrication due to the need to connect the X and Y lines electrically by through-hole conductors passing through the temperature-indicating layer 17. Further complications of structure and fabrication arise from the need to provide the same number of transparent resistive elements as the dots. The cost of these devices is accordingly high.

SUMMARY OF THE INVENTION

An object of the present invention is to solve the problems stated above.

Another object of this invention is to provide a planar thermal head and display device that are simple in structure and easy to fabricate.

According to one aspect of the invention, there is provided a planar thermal head comprising:

an electrically insulating base;

a plurality of parallel first electrode lines formed on a surface of the base;

an electrically resistive layer formed over the first electrode lines; and a plurality of parallel second electrode lines formed over the electrically resistive layer, and oriented to intersect the first parallel electrode lines, wherein a pair of electrodes respectively constituted of part of or connected to one of the first electrode lines and one of the second electrode lines is positioned on opposite sides of the resistive layer for causing a current flow through the resistive layer, and a part of the resistive layer through which a current is made to flow by the pair of electrodes forms a thermal dot.

With the structure described above, the electrode lines are selected according to image signal for printing or display, and voltage is applied to the selected electrode lines on the two sides of the resistive layer. Current then flows from one electrode line through the resistive layer to another electrode line on the other side. This current produces heat from the region (thermal dot) of the resistive layer located between the two electrode lines. This heat is conducted through the electrode line on the upper surface of the resistive layer to the outside, where it is used for printing or display.

According to another aspect of the invention, there is provided a planar thermal display device comprising:

an electrically insulating base;

a plurality of parallel first electrode lines formed on a surface of the base;

an electrically resistive layer formed over the first electrode lines; and a plurality of parallel second electrode lines formed over the electrically resistive layer, oriented to intersect the first parallel electrode lines;

wherein a pair of electrodes respectively connected to or constituted of part of one of the first electrode lines and one of the second electrode lines are positioned on opposite sides of the resistive layer for causing a current flow through the resistive layer, and a part of the resistive layer through which a current is made to flow by the pair of electrodes forms a thermal dot, the device further comprising a layer of thermally reversible material that changes color under the action of heat, located over the second electrode lines.

With the structure described above, the display is made as follows: Voltage is applied to selected electrode lines on the two sides of the resistive layer, the electrodes being selected according to an image signal. Current then flows from one selected electrode line through the resistive layer to another selected electrode line on the other side. This current produces heat from the region (thermal dot) of the resistive layer located between the two electrode lines. This heat is conducted through the electrode line on the upper surface of the resistive layer to the layer of thermally reversible material. The portion of that layer located above the thermal dot therefore changes color. If necessary, the image can be maintained for an extended time by repeatedly feeding voltage to the electrode lines. Restoration of the original color occurs naturally when the application of voltage to the electrode lines is stopped.

DETAILED DESCRIPTION OF THE PREFERRED EMBODIMENTS

Embodiments of the invention will now be described with reference to the drawings.

Figure 3:
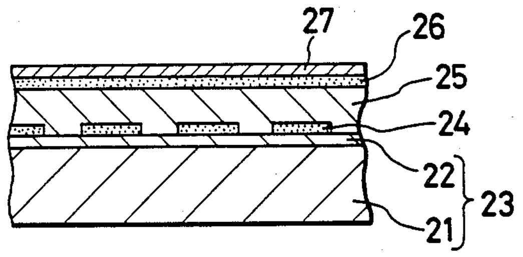
FIG. 3 is a cross sectional view showing an embodiment of the invention.

FIG. 3 is a cross-sectional view of an embodiment of this invention. The substrate 21 is an electrically insulating material such as a ceramic, glass, or plastic, or a metal material the surface of which has been treated to make it electrically nonconductive. A glazed glass layer 22 is formed on the substrate 21. The substrate 21 and glazed glass layer 22 form the base 23. The glazed glass layer 22 has the property of retaining heat. On the surface of the glazed glass layer 22 are a plurality of first or X electrode lines 24 spaced at substantially equal intervals running parallel in one direction (in FIG. 3 this direction is perpendicular to the page). The first electrode lines 24 are formed on the surface of the glazed glass layer 22, by plating, etching or other means. An electrically resistive layer 25 is applied to the surface of the glazed glass layer 22 and the first electrode lines 24. The electrically resistive layer 25 could be made from tantalum nitride, for example. On the surface of the electrically resistive layer 25 are placed a plurality of second or Y electrode lines 26, spaced at substantially equal intervals and oriented perpendicular to the direction in which the first electrode lines 24 run. The second electrode lines 26 can be formed by plating or etching. A region of the electrically resistive layer 25 positioned over one of the first electrode lines 24 and under one of the second electrode lines 26 forms a thermal dot. To the surface of the electrically resistive layer 25 including the second electrode lines 26 is attached a protective layer 27. Preferably, a material for the protective layer 27 should be electrically insulating, should have high thermal conductivity, and should adhere tightly to the second electrode lines 26 and the electrically resistive layer 25. For example, $SiO_2$ and $Ta_2O_5$ are suitable materials. The thickness can be 2 to 3 micrometers, for example. If the thermal head described in this embodiment is used in a thermal printer, printing can be accomplished by placing heat-sensitive paper in contact with the protective layer 27, without moving the heat-sensitive paper, or by placing an inked ribbon and paper in contact with the protective layer 27. Both schemes avoid sliding friction on the surface.

The operation of this embodiment of the invention is described next.

Figure 4:
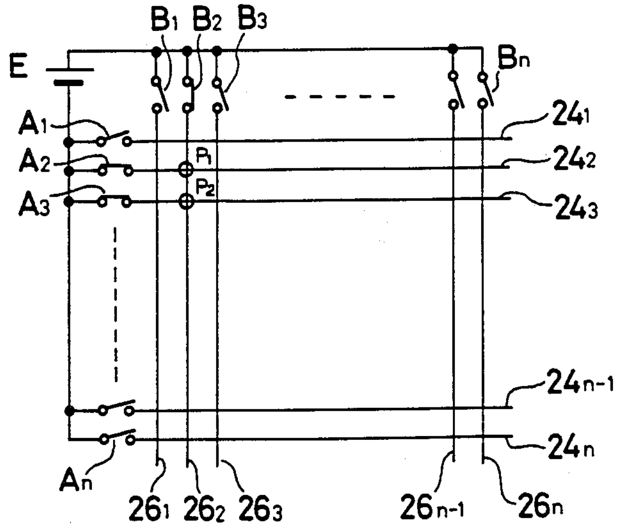
FIG. 4 is a diagram showing patterns of electrode lines of an embodiment of the invention.

FIG. 4 is a schematic diagram showing this embodiment of the present invention with a control circuit for driving it. In this drawing the electrode lines $24_1$ to $24_n$ are connected through switches $A_1$ $A_2$, . . . , $A_n$ to the negative terminal of a power supply E, and the electrode lines $26_1$ to $26_n$ are connected through switches $B_1$, $B_2$, . . . , $B_n$ to the positive terminal of the power supply E. The switches $A_1$, $A_2$, . . . , $A_n$ to $B_1$, $B_2$, . . . , $B_n$ are opened and closed in accordance with an image signal. Assume that in accordance with the image signal switches $A_2$, $A_3$, and $B_2$ are now closed. Current then flows from the positive terminal of the power supply E through switch $B_2$, the electrode line $26_2$, the resistive layer 25, the electrode lines $24_2$ and $24_3$, and switches $A_2$ and $A_3$ to the negative terminal of the power supply E. This current flow generates heat in the thermal dots labeled $P_1$ and $P_2$. This heat is conducted to the outside through the second electrode lines 26 and the protective layer 27 in FIG. 3. If heat-sensitive paper is in contact with the protective layer 27, the portions of the paper over the points $P_1$ and $P_2$ will change color.

Figure 1:
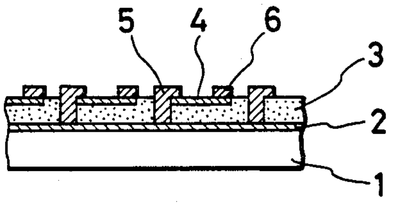
FIG. 1 PRIOR ART
FIG. 1 is a cross sectional view of a prior art planar thermal head.
Figure 2:
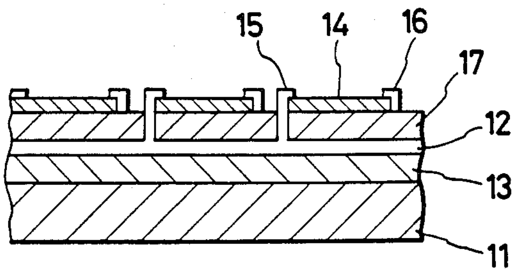
FIG. 2 PRIOR ART
FIG. 2 is a cross sectional view of a prior art display device using a planar thermal head.

This embodiment is structurally simpler than the prior art, because there is no need to provide an individual through-hole conductor and resistive element for each dot. Moreover, fabrication is simplified. In particular, a wet fabrication process (chemical etching) can be used. Such a process is difficult to employ with the structure of the planar thermal head in the prior art shown in FIG. 1. The lead wire routing and connections of the electrode lines can also be simplified because the electrode lines are oriented in the X and Y directions and each layer has a thin-film configuration. The density of the thermal dots can be freely altered by changing the spacing of the electrode lines. Moreover, because the electrically resistive layer 25 of the thermal head in this embodiment is located between the electrode lines 24 and 26, the electrode lines can be made to extend to cover most of the layer, so that radiation of residual heat from a thermal dot after its selective heat generation is greatly improved, and retention of heat inside the device is reduced. The result is an overall improvement in the thermal efficiency of the planar thermal head in this invention.

Figure 5A:
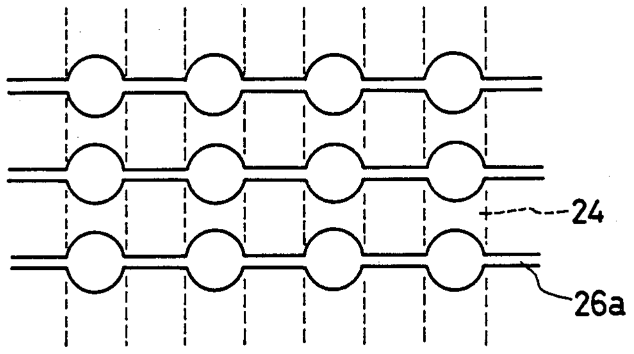
Figure 5B:
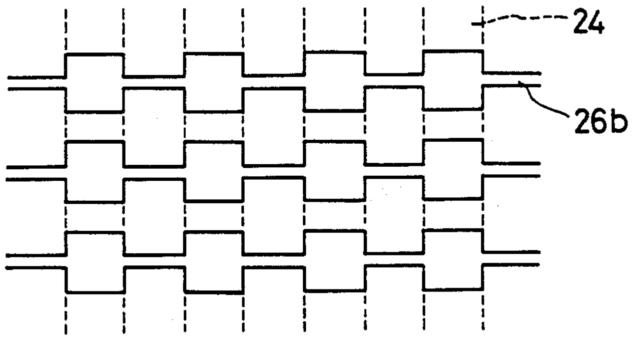

FIGS. 5a and 5b are examples of patterns for the second electrode lines 26 in this embodiment. The second electrode lines 26 in the embodiment described above has a constant width, but in FIGS. 5a and 5b the width (surface area) of the second electrode lines 26 in the regions of the thermal dot is greater than in other regions. These lines are accordingly labeled 26a and 26b. In this type of pattern the flow heat generated at one thermal dot to adjacent thermal dots via the electrode lines 26a or 26b is limited. Heat generated at the thermal dot is also conducted via the first electrode lines 24, but this heat is uniformly dissipated to the substrate 21 via the heat-retaining glazed glass layer 22.

Figure 6:
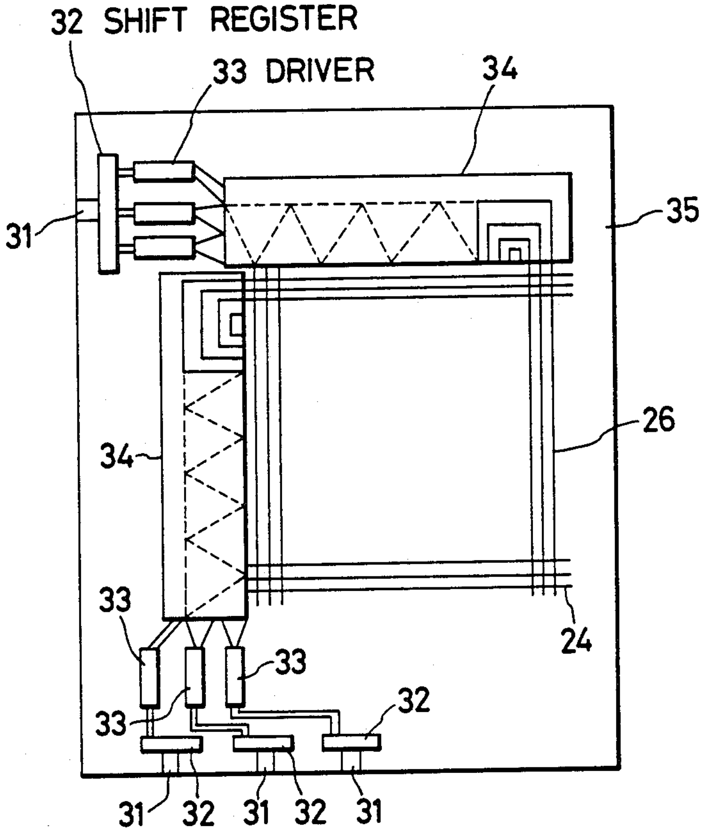
FIG. 6 is a plan view of a structure in which the present embodiment and its peripheral circuits are mounted on the same board.

FIG. 6 shows a top view of a device in which the planar thermal head of the above embodiment and its peripheral control circuits are mounted on the same base. Shown in this drawing are several signal terminals 31, shift registers 32, and drivers 33, the matrix wiring 34 connecting the drivers 33 to the electrode lines of the planar thermal head, and the base 35. Due to the simplicity of the structure and fabrication of a planar thermal head according to the present invention as described above, it is easy to fabricate the head and its peripheral control circuits on the same base as shown in FIG. 6.

Figure 7:
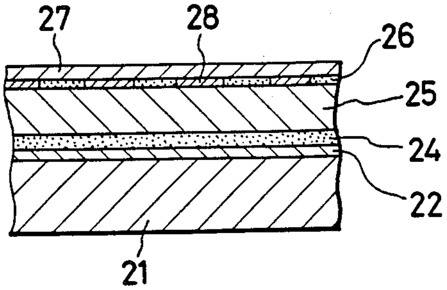
FIG. 7 is a cross sectional view of another embodiment of the invention.

FIG. 7 is a cross-sectional view of another embodiment of this invention, with parts identical to the corresponding parts in FIG. 3 indicated by the same numbers. In FIG. 7 the interstices between adjacent electrode lines 26 on the electrically resistive layer 25 are filled with a thermally insulating material 28 having the same height as the electrode surface of the second electrode lines 26. The purpose of the insulating material 28 is to prevent the diffusion of heat to adjacent second electrode lines 26; that is, to regions adjacent to the thermal dot. This structure improves the conduction of heat toward the outside. Moreover the provision of the insulation layer reduces leakage current between adjacent electrode lines, thereby preventing generation of heat at nonselected thermal dots. The points noted in relation to FIGS. 4 through 6 apply also to this embodiment of the invention.

The embodiments as described above have the following effects:

(a) Because a planar thermal head manufactured according to this invention comprises a structure in which electrode lines are located on opposite sides of a resistive layer, it is not necessary to provide separate conductors and resistive elements for each thermal dot as in the prior art. The structure is therefore simple and easy to manufacture, and the density of the thermal dots can be increased. The yield of the manufacturing process is also improved.

(b) Due to the above structure, heat generated at the thermal dots is not dissipated into the thermally insulating layer, but is discharged to the outside with very high efficiency. Less driving power is therefore required than in the prior art.

(c) The pattern and thickness of the electrode lines can be altered in suitable ways for fine control of the caloric output and the locations in which heat is generated.

These features of the above described embodiments make it well suited for use in thermal printers and thermal display devices.

Figure 8:
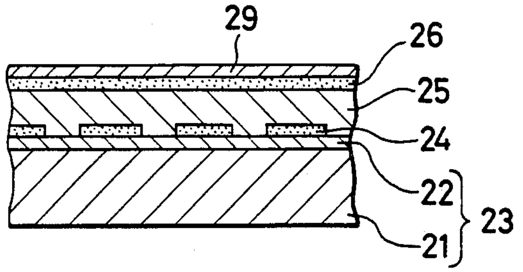
FIG. 8 is a cross sectional view of a further embodiment of the invention.
Figure 9:
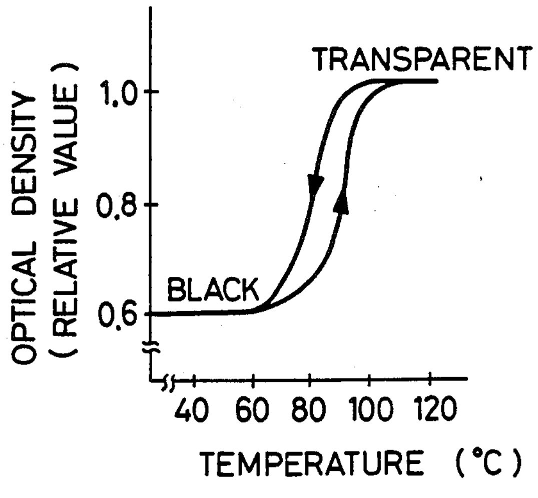
FIG. 9 is a diagram showing the temperature-optical density characteristic of a thermally reversible material used in the embodiment of FIG. 8.

FIG. 8 is a cross-sectional view showing a display device incorporating a thermal head similar to that shown in FIG. 3. It comprises a base 23 formed of a substrate 21 and a glazed glass layer 22, a plurality of first electrode lines 24, an electrically resistive layer 25, and a plurality of second electrode lines 26, which are all similar to those shown in FIG. 3 with identical reference numerals. In addition, there is provided a thermosheet 29. The thermosheet 29 has its surface coated with a substance having as its principle component a thermally reversible material with a temperature v. optical density characteristic like that shown in FIG. 9. As can be seen from FIG. 9, this material is characterized in that its thermal transition zone is located at a relatively high temperature, and in that the color change is highly sensitive to temperature variations (i.e. there is small retention of heat). An example of a pigment with these properties is silver mercury iodide ($Ag_2HgI_4$). The thermosheet 29 made of this material is secured tightly to the entire surface of the electrically resistive layer 25 and the elctrode lines 26, by an adhesive or other means.

Thermosheet 29 is available in blue, yellow, brown, and other colors, so by stripping off one thermosheet 29 and reattaching another, the display can be modified to make displays in different colors to suit particular purposes. In this case the thermosheet 29 should be attached in such a way that it can be removed.

The operation of the device is described next. When voltage is applied to an electrode line 24 and an electrode line 26, current passes from the electrode line 24 through the electrically resistive layer 25 to the electrode line 26 (or in the reverse direction), heating the region (thermal dot) of the electrically resistive layer 25 located between the electrode line 24 and the electrode line 26. This heat is conducted through the electrode line 26 to the thermosheet 29. The area of the thermosheet 29 thus heated changes color. Because of the small heat retentivity of the thermally reversible material of the thermosheet 29 noted in FIG. 9, the contrast of the color change on the thermosheet 29 is extremely high. In this embodiment, an excellent display is obtained from natural light incident on the outer surface of the thermosheet 29. Another advantage is that since the color change takes places at a comparatively high temperature, and with high sensitivity no cooling means is needed to restore the original color. If necessary the changed color can be maintained for an extended time by repeated heating of the thermosheet 29 at short intervals.

Figure 10:
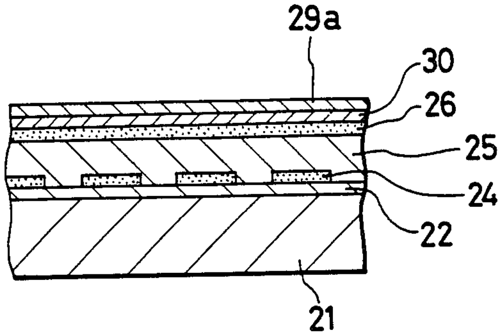
FIG. 10 is a cross sectional view of a further embodiment of the invention.

FIG. 10 is a cross-sectional view of another embodiment of this invention, with parts identical to the corresponding parts in FIG. 8 indicated by the same numbers. In FIG. 10 a protective layer 30 is applied to the surface of the electrically resistive layer 25 and the electrode lines 26. The protective layer 30 could be made of $Ta_2O_5$ or $SiO_2$, for example. The thickness can be 2 to 3 micrometers, for example. A layer of thermally reversible material 29a is applied directly to the surface of the protective layer 30. The operation of this display device is the same as the operation of the device in FIG. 8, so further explanation is omitted.

Another possible structural addition is a thin, transparent protective layer (not illustrated) applied to the thermosheet 29 in FIG. 10. With this arrangement, it is possible to write, by a suitable pen, and erase on the surface of this protective layer, in superposition of the displayed image.

Figure 11:
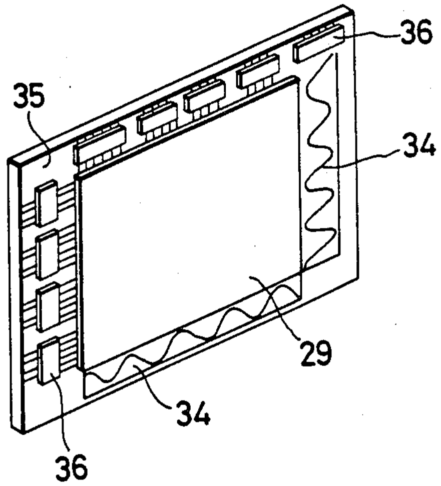
FIG. 11 is an oblique view of a structure in which the display device of an embodiment of the invention is mounted on the same board as its peripheral circuits.

The structures shown in FIGS. 8 and 10 can be combined with peripheral control circuits in a manner shown in FIG. 11. In FIG. 11 the peripheral control circuits (shift registers and drivers) 36 and the matrix wiring 34 are mounted on the same base 35 as the display itself.

The embodiments as described above with reference to FIGS. 8 through 11 have the following effects:

(a) The structure of the embodiments, with the electrode lines located on both sides of the resistive layer, is simple and easy to manufacture. The density of the thermal dots and hence the resolution of the display are improved.

(b) Because the layer including the thermally reversible material (a thermosheet, for example) is fixed in position with respect to the heating elements, there is no need for relative motion between the heating elements and the thermally reversible material.

Figure 12A:
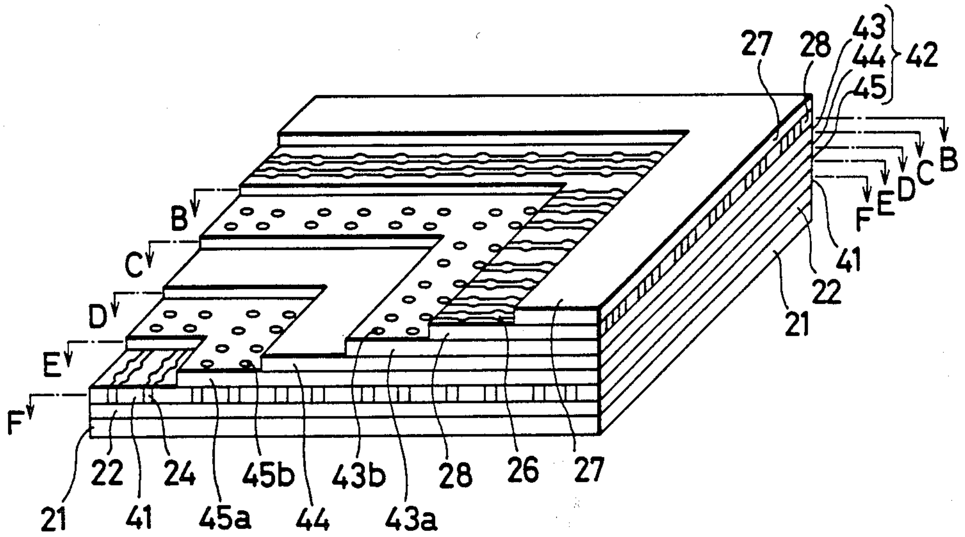
FIG. 12*a* is a perspective view, partially cut away, showing a further embodiment of the invention.
Figure 12B:
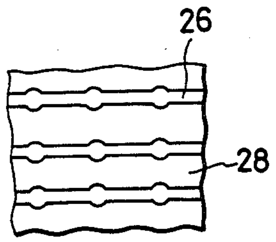
FIGS. 12*b* through 12*f* are sectional views along lines B—B, C—C, D—D, E—E and F—F in FIG. 12*a;*
Figure 12C:
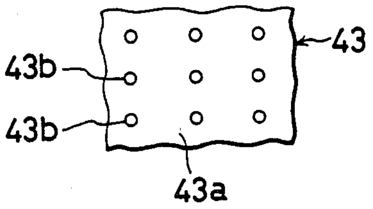
Figure 12D:
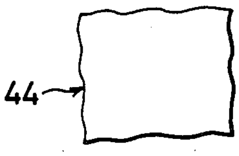
Figure 12E:
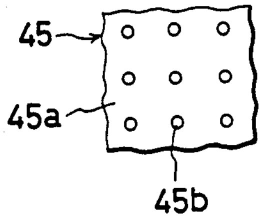
Figure 12F:
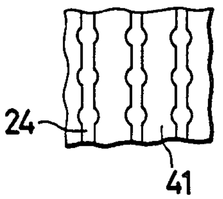
Figure 13A:
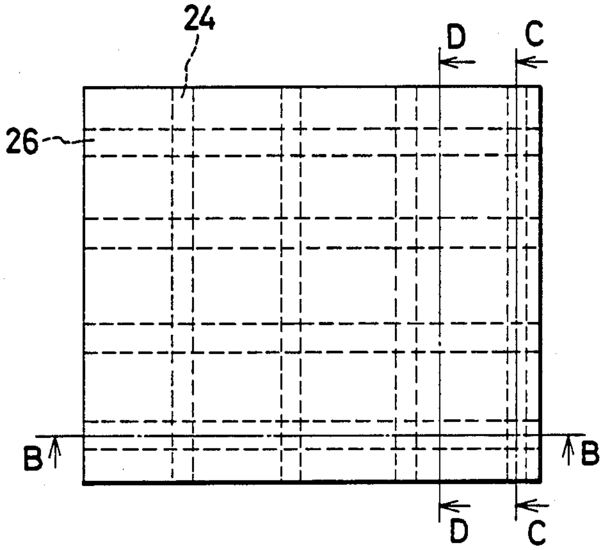
FIG. 13*a* is a plan view showing a further embodiment of the invention.
Figure 13B:
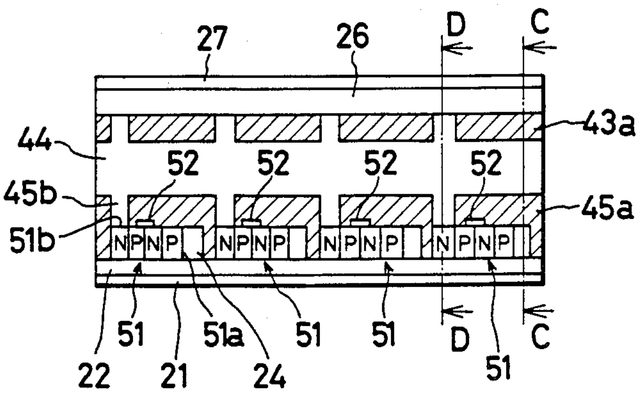
FIGS. 13*b*, 13*c* and 13*d* are sectional views along lines B—B, C—C and D—D in FIG. 13*a;*
Figure 13C:
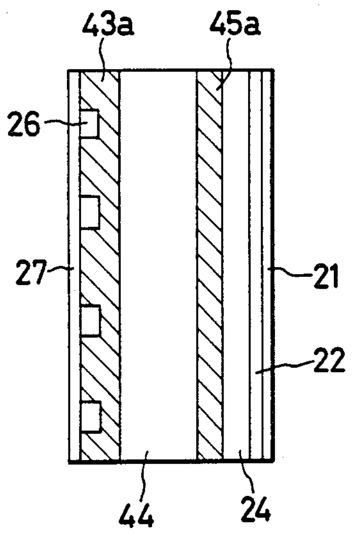
Figure 13D:
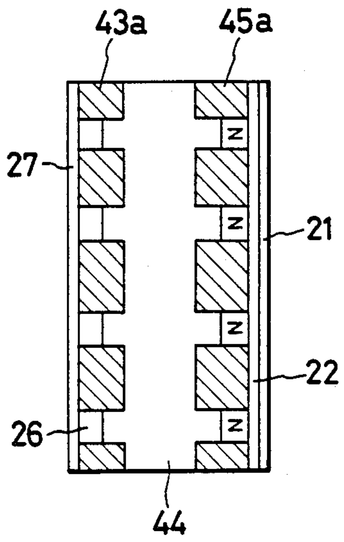

FIGS. 12*a* through 12*f* show a further embodiment of the invention. In this embodiment, the interstices between adjacent electrode line 26 are filled with a thermally insulating material 28, as shown in FIG. 12*b*, in the same way as the embodiment of FIG. 7. Moreover, the interstices between adjacent first electrode lines 24 are filled with a thermally insulating material 41, as is best seen from FIG. 12*f*. The electrically resistive layer 42 of this embodiment comprises three sub-layers 43, 44 and 45. The middle layer 44 (FIG. 12*d*) is a continuous layer of an electrically resistive material. The upper and the lower layers 43 and 45 (FIGS. 12*c* and 12*e*) are layers 43*a*, 45*a* of an insulating material with spots of resistive material 43*b*, 45*b* arranged in matrix, i.e., at the positions of the thermal dots. The spots of the resistive material 43*b*, 45*b* are continuous with the resistive layer 44. Thus, at the positions of the thermal dots, the resistive material is continuous in the vertical direction to form resistive elements. The provision of the insulating material 43*a*, 45*a* surrounding the spots of the resistive material 43*b*, 45*b* reduces diffusion of heat from the selected thermal dot to the neighbouring regions, which reduces the power necessary to heat the selected thermal dot.

As a modification, the layer 43 or the layer 45, or both can be eliminated. If both of the layers 43 and 45 are eliminated, the structure is similar to that shown in FIG. 7 except for the provision of the insulating material 41.

FIGS. 13*a* to 13*d* show a further embodiment of the invention. This embodiment is generally similar to the embodiment of FIGS. 12*a* through 12*f*, except that there is further provided a diode element 51 for each thermal dot. The diode element has one electrode, e.g., anode 51*a* connected to a first electrode line 24 and has the other electrode, e.g., cathode 51*b* connected to the spot of resistive materials 45*b*. The diode element 51 can be formed of a polysilicon layer deposited by CVD (chemical vapor deposition) and selectively doped with p-type and n-type impurities, and etched to have the desired pattern. The reverse biased p-n junction is shorted or bypassed by an A1 layer 2. The first electrode lines 24 can be formed to be in contact, at one side thereof, with the anodes 51*a* of the diode elements arranged in line (along the first electrode line) with each other, In the illustrated configuration, each thermal dot is formed at a position where the cathode 51*b* of each diode element 51 is exposed to and connected with the resistive layer 45*b* rather than at an intersection between a first electrode line 24 and a second electrode line 26. The insulating layer 45*a* over the first electrode lines 24 serves to prevent a current from flowing directly from the first electrode lines 24 into the resistive layer 44.

Figure 14:
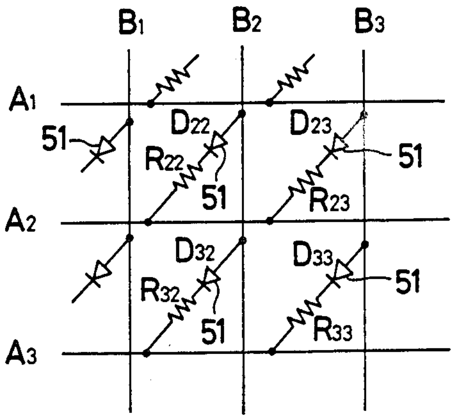
FIG. 14 is a schematic diagram showing part of a matrix of thermal dots.
Figure 15A:
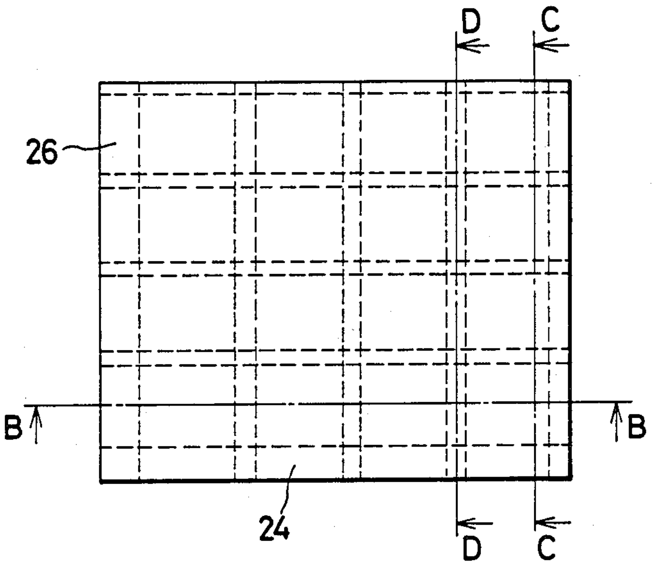
FIGS. 15*a* is a plan view showing a further embodiment of the invention.
Figure 15B:
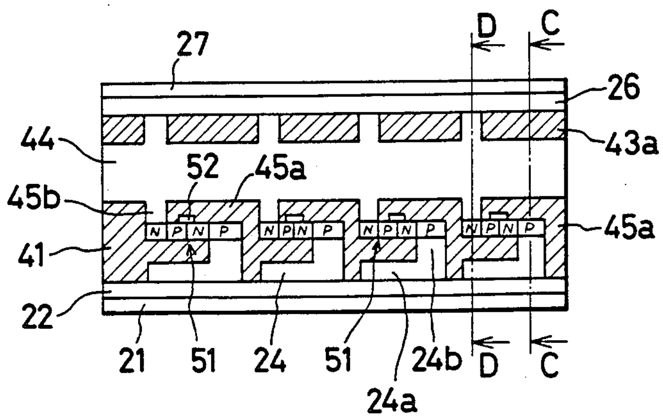
FIGS. 15*b*, 15*c* and 15*d* are sectional views along lines B—B, C—C and D—D in FIG. 15*a;*
Figure 15C:
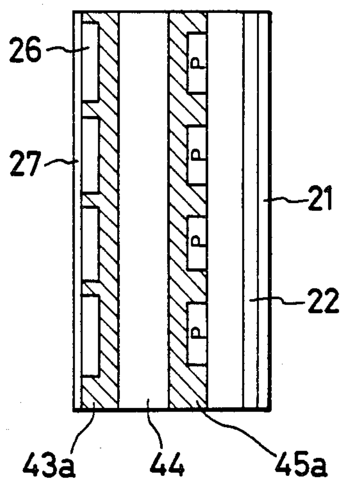
Figure 15D:
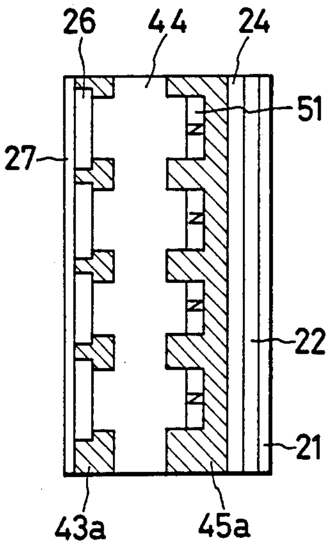

The circuitry of the matrix of the thermal dots with diode elements is shown in FIG. 14. The function of the diode elements 51 is to prevent heat generation at nonselected thermal dots. If the diode elements 51 are not provided, there can be a small current flowing through the resistive elements R of the nonselected thermal dots. For instance, if a thermal dot at an intersection between the electrode lines B3 and A2 is selected, a part of the current which has passed the resistive element R23 at the intersection between B3 and A2 may then pass through the resistive element R22 at the intersection between A2 and B2 and into the line B2. As a result, heat is generated at the nonselected thermal dot at the intersection between B2 and A2. Provision of the diode elements avoid such undesired heat generation at the nonselected thermal dots.

FIGS. 15*a* through 15*d* show a further embodiment of the invention. This embodiment is similar to the embodiment of FIGS. 13*a* through 13*d* except that the diode elements 51*a* have their anodes 51*a* connected, at the lower surface thereof, with respective first electrode lines 24. Each first electrode line 24 comprises a wide lower part 24*a* and a thin upper part 24*b* continuous with the wide lower part 24*a* and connected, at its upper surface, with the anode of the diode element 51.

Figure 16C:
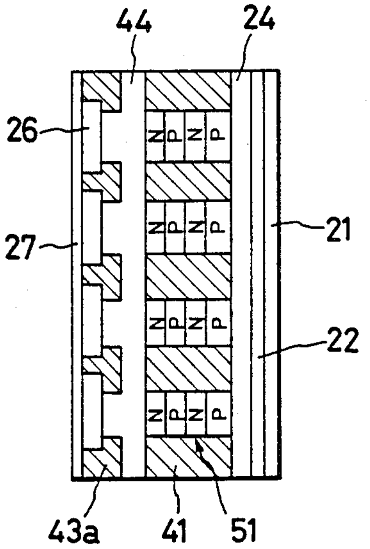
FIGS. 16*b* and 16*c* are sectional views along lines B—B and C—C in FIG. 16*a*.
Figure 16A:
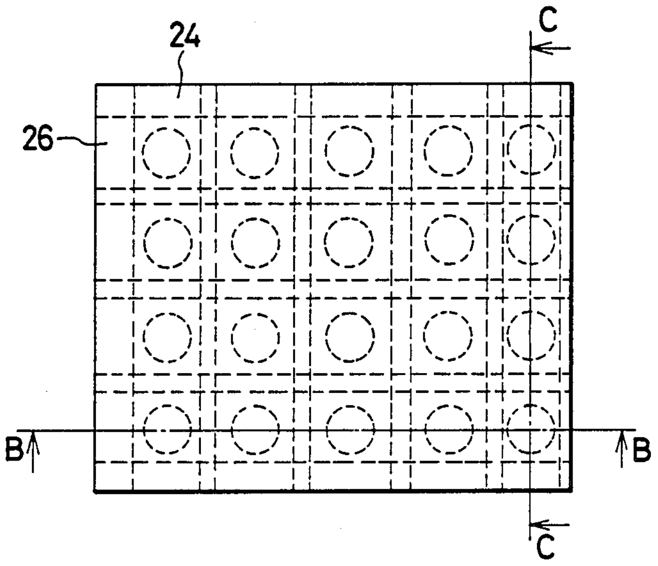
FIG. 16*a* is a plan view showing a further embodiment of the invention.
Figure 16B:
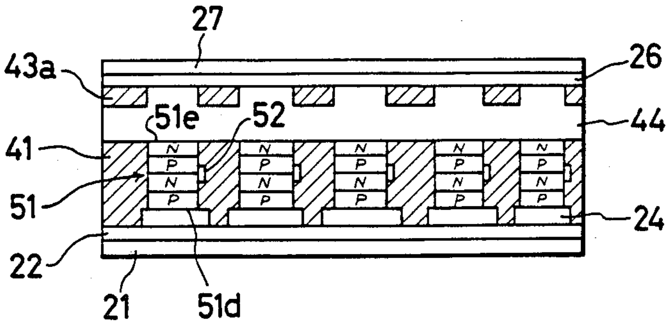

FIGS. 16*a* through 16*c* show a further embodiment of the invention. This embodiment is similar to the embodiments of FIGS. 13*a* through 13*d* and 15*a* through 15*d* except that each diode element 51 comprises a stack of p-type and n-type layers, with the stack extending in the vertical direction, i.e., plane of the planar thermal head. The lower end of the stack forming an anode 51*d* is connected to a first electrode line 24. The upper end of the stack forming a cathode 51e is exposed to and connected with the resistive layer 44.

What is claimed is:

1. A planar thermal head comprising:

an electrically insulating base;

a plurality of parallel first electrode lines formed on a surface of the base;

an electrically resistive layer formed over said first electrode lines; and a plurality of parallel second electrode lines formed over said electrically resistive layer, said second electrode lines being oriented to intersect said first parallel electrode lines, wherein a pair of electrodes respectively constituted of part of or connected to one of said first electrode lines and one of said second electrode lines are positioned on opposite sides of said resistive layer for causing a current flow through said resistive layer, whereby a part of said resistive layer through which a current is made to flow by said pair of electrodes forms a thermal dot.

2. A planar thermal head according to claim 1, further comprising a layer of insulating material filling interstices between adjacent ones of said first electrode lines or said second electrode lines.

3. A planar thermal head according to claim 1, wherein said resistive layer comprises a continuous layer of a resistive material extending throughout the area in which said thermal dots are formed.

4. A planar thermal head according to claim 3, wherein said resistive layer further comprises a layer comprising spots of resistive material formed at the positions of said thermal dots, said spots of resistive material being continuous with said continuous layer of resistive material, and insulating material surrounding said spots of resistive material.

5. A planar thermal head according to claim 3, wherein said pair of electrodes for causing a current to flow through said resistive layer is in direct contact with said resistive layer on the opposite surfaces of said continuous layer of resistive material.

6. A planar thermal head according to claim 1, further comprising a diode element for each of said thermal dots, each of said diode elements having one electrode connected to one of said first electrode lines and having the other electrode connected to said resistive layer.

7. A planar thermal head according to claim 6, wherein all of said diode elements have their electrodes of the same polarity connected to said first electrode lines.

8. A planar thermal head according to claim 1, wherein said first electrode lines are spaced at equal intervals, and wherein said second electrode lines are spaced at equal intervals.

9. A planar thermal head according to claim 1, wherein said first and second electrode lines are oriented so as to intersect at right angles with respect to each other.

10. A display device comprising:

an electrically insulating base;

a plurality of parallel first electrode lines formed on a surface of said base;

an electrically resistive layer formed over said first electrode lines;

a plurality of parallel second electrode lines formed over said electrically resistive layer, said second electrode lines being oriented to intersect said first parallel electrode lines; and a layer of thermally reversible material positioned over said second electrode lines, said thermally reversible material changing color when exposed to heat, wherein a pair of electrodes respectively connected to or constituted of part of one of said first electrode lines and one of said second electrode lines are positioned on opposite sides of said resistive layer for causing a current flow through said resistive layer, whereby a part of said resistive layer through which a current is made to flow by said pair of electrodes forms a thermal dot.

11. A display device according to claim 10, further comprising a layer of insulating material filling interstices between adjacent ones of said first electrode lines or said second electrode lines.

12. A display device according to claim 10, wherein said resistive layer comprises a continuous layer of a resistive material extending throughout the area in which said thermal dots are formed.

13. A display device according to claim 12, wherein said resistive layer further comprises a layer comprising spots of resistive material formed at the positions of said thermal dots, said spots of resistive material being continuous with said continuous layer of resistive material, and insulating material surrounding said spots of resistive material.

14. A display device according to claim 12, wherein said pair of electrodes for causing a current to flow through said resistive layer is in direct contact with said resistive layer on the opposite surfaces of said continuous layer of resistive material.

15. A display device according to claim 10, further comprising a diode element for each of said thermal dots, each of said diode elements having one electrode connected to one of said first electrode lines and having the other electrode connect to said resistive layer.

16. A display device according to claim 15, wherein all of said diode elements have their electrodes of the same polarity connected to said first electrode lines.

17. A display device according to claim 10, wherein said first electrode lines are spaced at equal intervals, and wherein said second electrode lines are spaced at equal intervals.

18. A display device according to claim 10, wherein said first and second electrode lines are oriented so as to intersect at right angles with respect to each other.

19. A device according to claim 10, wherein a sheet having said layer of thermally reversible material thereon is formed directly on said second electrode lines.

20. A device according to claim 10, further comprising means for repeatedly applying a pulsative current to a selected thermal dot, the interval between successive pulses being such that a pulse is applied before said thermally reversible material that has changed its color by a previous application of a pulse turns to the original color.

* * * * *